United States Patent [19]

Clausius

[11] Patent Number: 4,496,533
[45] Date of Patent: Jan. 29, 1985

[54] PROCESS FOR PURIFYING GRAPHITE

[75] Inventor: Richard A. Clausius, Chicago, Ill.

[73] Assignee: Atlantic Richfield Company, Philadelphia, Pa.

[21] Appl. No.: 438,814

[22] Filed: Nov. 3, 1982

[51] Int. Cl.³ .................. C01B 31/04; B03D 3/38; B03D 1/00
[52] U.S. Cl. .................. 423/448; 209/171
[58] Field of Search .......... 423/448; 209/171

[56] References Cited

U.S. PATENT DOCUMENTS 736,381  8/1903  Glogner ............. 209/171
771,075  9/1904  Kendall ............. 209/171

Primary Examiner—Gregory A. Heller
Attorney, Agent, or Firm—John B. Goodman

[57] ABSTRACT

A process for purifying graphite comprising:
(1) comminuting graphite containing mineral matter to liberate at least a portion of the graphite particles from the mineral matter;
(2) mixing the comminuted graphite particles containing mineral matter with water and hydrocarbon oil to form a fluid slurry;
(3) separating a water phase containing mineral matter and a hydrocarbon oil phase containing graphite particles; and
(4) separating the graphite particles from the hydrocarbon oil to obtain graphite particles reduced in mineral matter.

Depending upon the purity of the graphite desired, steps of the process can be repeated one or more times to provide a progressively purer graphite.

9 Claims, No Drawings

PROCESS FOR PURIFYING GRAPHITE

BACKGROUND OF THE INVENTION

1. Field of the Invention

The field of this invention relates to purifying graphite, especially natural graphite.

2. Prior Art

Graphite is a form of elemental carbon crystallized predominantly in the hexagonal system. Silicate mineral impurities varying in kind and percentage are usually associated with graphite in the ore.

The uses of natural graphite are dependent upon its physical and chemical properties. It is unctuous, which accounts for its demand as a dry lubricant and which, combined with its high electrical conductivity, makes it useful for motor and generator brushes. It is soluble in molten iron and, therefore, is used to raise the carbon content of steel. Its largest single use probably still is for foundry facings, where it prevents metals and alloys from sticking to the molds. Graphite is unequaled for many refractory uses, including crucibles, because of its high heat conductivity, its slow burning property and its ability to retain good strength at high temperatures. It is probably best known, however, for its use in such products as pencils, batteries, paints and inks, and brake linings.

Natural graphite is sold in several different grades. Low grade (low purity) graphite has several substantial uses.

For example, foundry facings have accounted for nearly 20 percent of the total consumption in the past years. Low quality and amorphous graphite is suitable for this use. The graphite is mixed with a small amount of clay, suspended in an adhesive material and applied as thin coatings to mold surfaces to provide for clean and easy recovery of the metal castings.

Another large user of low quality graphite is the steel industry. The graphite is added to steel melts to increase the carbon content to the desired level.

Other uses of graphite require that the graphite have very high purity. High purity natural graphite is required, for example, when the graphite is employed in lubricants or in forming high temperature refractory crucibles. These high purity (premium grade) natural graphites are substantially more valuable than low grade graphite. Flake graphite from disseminated deposits must be concentrated to meet market requirements. Virtually every known concentrating device and combination of separating principles has been tried in an effort to upgrade or purify natural graphite. The mineral has gained a reputation of being difficult to concentrate and upgrade. It has been reported that a high proportion of mills built to refine or purify natural graphite have failed to make commercial recoveries. Graphite actually is one of the easiest minerals to segregate into a rough concentrate, but one of the most difficult to refine into a high purity product.

Heretofore, attempts to purify graphite have involved various conventional flotation techniques. Although high recoveries are common employing prior art flotation techniques, concentrates with acceptable graphitic carbon content are difficult to attain and, indeed, with some ores, impossible. The chief problem lies with the depression of the gangue minerals. Relatively pure grains of quartz, mica and other gangue minerals inadvertently become smeared with fine graphite, making them floatable such that it becomes next to impossible to obtain a high grade natural product by flotation.

Seemingly, no mechanical process will yield flake graphite of extremely high purity. High purity products can be obtained by employing certain costly chemical processes. For example, silica mineral matter can be eliminated from graphite with HF or by fusion with an alkali such as sodium carbonate. These chemical processes are less than satisfactory, however, because they are generally costly, employ hazardous chemicals and/or extreme operating conditions.

Clearly, there remains a present need for a simple process to obtain a high purity graphite material.

SUMMARY OF THE INVENTION

In summary, this invention presents a process for purifying graphite comprising:
(1) comminuting graphite containing mineral matter to liberate at least a portion of the graphite particles from the mineral matter;
(2) mixing the comminuted graphite particles containing mineral matter with water and hydrocarbon oil to form a fluid slurry;
(3) separating a water phase containing mineral matter and a hydrocarbon oil phase containing graphite particles; and
(4) separating the graphite particles from the hydrocarbon oil to obtain graphite particles reduced in mineral matter.

Depending upon the purity of the graphite desired, steps of the process can be repeated one or more times to provide a progressively purer graphite.

DETAILED DESCRIPTION OF THE INVENTION AND ITS PREFERRED EMBODIMENTS

This invention presents a process for purifying graphite comprising:
(1) comminuting graphite containing mineral matter to liberate at least a portion of the graphite particles from the mineral matter;
(2) mixing the comminuted graphite particles containing mineral matter with water and hydrocarbon oil to form a fluid slurry;
(3) separating a water phase containing mineral matter and a hydrocarbon oil phase containing graphite particles; and
(4) separating the graphite particles from the hydrocarbon oil to obtain graphite particles reduced in mineral matter.

Graphites which can be employed in the process of the invention include amorphous, flake and crystalline natural graphite, and low purity synthetic graphite. An especially preferred graphite for use in this invention is the natural flake graphite from Senja Island in Norway.

Comminuting the graphite containing mineral matter can be accomplished in a variety of ways. For example, grinding or crushing in a ball mill, rod mill or the equivalent thereof can liberate graphite particles from mineral matter, as provided for in the first step of the process of this invention. Generally, the comminuted graphite containing mineral matter will have a size consist such that it will pass a 9 mesh screen and be retained on a 100 mesh screen; preferably it will pass a 28 mesh screen and be retained on a 100 mesh screen.

In the next step of the process of this invention, the comminuted graphite particles containing mineral matter are mixed with water and hydrocarbon oil to form a fluid slurry. A suitable fluid slurry can contain from about 1 part comminuted graphite containing mineral matter, and from about 2 to 10 parts water and from about 2 to 10 parts hydrocarbon oil. Depending on the graphite ore employed, the ratio of comminuted graphite containing mineral matter, water and hydrocarbon oil can be adjusted to achieve optimum separation of the graphite and mineral matter.

The hydrocarbon oils suitable for use in the process of this invention are light hydrocarbon oils having a boiling point of from about 130° F. to 250° F. A preferred hydrocarbon oil is naphtha.

Preferably, the mixing of the comminuted graphite particles containing mineral matter, water and hydrocarbon oil is done vigorously, for example, agitated by the shearing action of a blender, to insure a thorough contacting of the components of the fluid slurry. In particular, it is desired that the water "wet" the mineral matter such that the mineral matter will preferentially associate with the water and that the hydrocarbon "wet" the graphite particles such that the graphite particles will preferentially associate with the hydrocarbon oil. When this is accomplished two distinct fluid phases can form: a water phase containing mineral matter and a hydrocarbon oil phase containing graphite particles. Generally, it is desirable to allow the vigorously mixed fluid slurry of comminuted graphite containing mineral matter, water and hydrocarbon oil to stand quiescently for a period of time sufficient for a good phase separation to occur.

In the third step of the process of this invention, the water phase with mineral matter preferentially associated in it is separated from the hydrocarbon oil phase with graphite particles preferentially associated in it. The result of such a separation is that a preferential separation of graphite particles from mineral matter is obtained.

A separation of the water phase containing mineral matter from the hydrocarbon oil phase containing graphite particles can be made employing known techniques. For example, a separatory funnel can be employed to make such a separation. Other devices, for example, centrifuges, can also be employed.

Generally, the separation of graphite particles from mineral matter in the above process steps is preferential—not perfect. A hydrocarbon oil fraction enriched in graphite is obtained and a water fraction enriched in mineral matter is obtained. It is a preferred aspect of this invention, therefore, to repeat all or several of the process steps of the invention on graphite and mineral matter enriched fractions to further purify the graphite enriched and recover additional graphite from the mineral matter enriched fraction.

Whether or not all or several of the above process steps are repeated, or some steps repeated more often than others, will depend upon a variety of factors such as the graphite ore employed, the purity of the graphite desired, and the value of recovered graphite.

In the final step of the process of this invention, the graphite particles are separated from the hydrocarbon oil to obtain graphite particles reduced in mineral matter. The graphite particles can be separated from the hydrocarbon oil in a variety of ways. For example, screens or bar sieves can be employed to separate graphite particles from the hydrocarbon oil. Residual hydrocarbon oil remaining with the graphite particles can be removed by working with a low boiling hydrocarbon oil solvent for example, hexane, acetone, toluene or ethanol.

The following examples specifically illustrate several embodiments of the invention.

EXAMPLE I

Medium purity graphite can be obtained from run of mine graphite ore in the following manner.
(1) Run of mine graphite ore containing about 23% graphite is crushed and screened to provide a minus 28 mesh product containing graphite particles and mineral matter.
(2) One hundred parts of this graphite-containing mineral matter is mixed with 400 parts naphtha followed by the addition of 400 parts water to form a fluid slurry. The blend slurry is then agitated for 6 minutes in a blender.
(3) The fluid slurry is then poured into a separatory funnel, allowed to remain quiescent for a short period of time, and then separately the naphtha-graphite layer and water-ash layer are drawn off.
(4) The water-ash layer is immediately poured into a second separatory funnel and allow further phase separation. This allows further graphite recovery.
(5) The graphite is separated from the naphtha-graphite by screening and recovered naphtha saved for further extractions.
(6) Steps 2 and 3 are repeated on the product obtained in step 5 to further purify the graphite.
(7) Steps 2, 3 and 5 are repeated on the product obtained in step 6 to obtain a medium purity graphite.

If this medium purity graphite is the desired product, the separated graphite particles are washed with acetone and dried to obtain a graphite product reduced in mineral matter. The medium purity graphite obtained contains about 83% graphite.

To obtain very pure graphite, it can be desirable to further grind the medium purity graphite to liberate additional mineral matter.

EXAMPLE II

A high purity graphite can be obtained in the following manner.
(1) The medium purity graphite product from Step 7 of Example I (100 parts) is placed in a ball mill with water (350 parts) and ground for 30 minutes.
(2) The graphite is then rinsed off the metal balls and ball jar with water.
(3) The slurry is then filtered to remove excess water.
(4) The graphite is put into a blender with 400 parts water and 300 parts naphtha and blended for 2½ minutes.
(5) The slurry is then poured into a separatory funnel allowed to remain quiescent for a short period of time, and separately the naphtha-graphite and water-ash layers are drawn off.
(6) Four hundred parts water is added to the separated hydrocarbon oil graphite layer and blended in a blender for 30 seconds.
(7) This is screened on a 100 mesh screen to separate graphite.
(8) Steps 6 and 7 are repeated. The above procedure produces a 1st stage graphite product.
(9) Steps 1 and 2 are repeated using the 1st stage graphite.
(10) The slurry is screened on a 200 mesh screen to remove excess water.

(11) The graphite is then put in a blender with 400 parts water and 100 parts of naphtha and blended for 1½ minutes.
(12) Steps 5 thru 8 are repeated.
(13) The separated graphite is then washed with acetone and dried to provide a high purity graphite product.

The high purity graphite product obtained contains about 97% graphite.

All parts and percentages referred to herein are on a weight basis.

Screen sizes referred to herein are U.S. screen sizes.

What is claimed is:

1. A process for purifying graphite comprising:
   (1) comminuting graphite containing mineral matter to liberate at least a portion of the graphite particles from the mineral matter;
   (2) mixing the comminuted graphite particles containing mineral matter with water and hydrocarbon oil having a boiling point of from about 130° F. to 250° F. to form a fluid slurry;
   (3) separating a water phase containing mineral matter and a hydrocarbon oil phase containing graphite particles; and
   (4) separating the graphite particles from the hydrocarbon oil to obtain graphite particles reduced in mineral matter.

2. The process of claim 1 wherein the hydrocarbon oil is naphtha.

3. The process of claim 1 wherein the fluid slurry comprises about 1 part comminuted graphite-containing mineral matter from about 2 to 10 parts water and from about 2 to 10 parts hydrocarbon oil.

4. The process of claim 1 wherein steps (2), (3) and (4) are repeated one or more times.

5. The process of claim 1 wherein steps (1), (2), (3) and (4) are repeated one or more times.

6. The process of claim 5 wherein steps (2), (3) and (4) are repeated one or more times.

7. The process of claim 1 wherein the graphite-containing mineral matter is comminuted to a particle size such that it will pass a 9 mesh screen.

8. The process of claim 1 wherein the graphite-containing mineral matter is comminuted to a particle size such that it will pass a 28 mesh screen.

9. The process of claim 8 wherein the graphite-containing mineral matter is comminuted to a particle size such that it will pass a 28 mesh screen and be retained on a 100 mesh screen.

* * * * *